United States Patent [19]

Blomgren

[11] Patent Number: 4,470,180

[45] Date of Patent: Sep. 11, 1984

[54] DEVICE FOR RESTRAINING AN OBJECT OR OBJECTS THEREIN

[75] Inventor: Jack P. Blomgren, Red Wing, Minn.

[73] Assignee: Minnesota Mining and Manufacturing Company, St. Paul, Minn.

[21] Appl. No.: 266,896

[22] Filed: May 26, 1981

[51] Int. Cl.³ .............................................. A44B 21/00
[52] U.S. Cl. .................................. 24/563; 24/30.5 P; 24/30.5 S; 206/306
[58] Field of Search ............... 24/255 R, 255 BS, 256, 24/255 SC, 17 B, 17 AP, 30.5 R, 30.5 S

[56] References Cited

U.S. PATENT DOCUMENTS

| | | | |
|---|---|---|---|
| 1,817,776 | 8/1931 | Sipe | 24/255 BS |
| 3,170,213 | 2/1965 | Thomas, Jr. | 24/30.5 S X |
| 3,259,302 | 7/1966 | Rocchisani | 24/30.5 P |
| 3,283,894 | 11/1966 | Hafner et al. | 206/306 |
| 3,913,187 | 10/1975 | Okuda | 24/255 BS |
| 3,918,920 | 11/1975 | Barber | 206/306 X |
| 3,962,757 | 6/1976 | Gedney | 24/30.5 S X |

FOREIGN PATENT DOCUMENTS 1255105  1/1961  France .............................. 24/30.5 S

OTHER PUBLICATIONS

Aviation Week and Space Technology; pp. 74, 75; Sep. 15, 1980.

*Primary Examiner*—William E. Lyddane
*Assistant Examiner*—Peter A. Aschenbrenner
*Attorney, Agent, or Firm*—Donald M. Sell; James A. Smith; David W. Anderson

[57] ABSTRACT

A simplified and low cost device for restraining an object or objects therein having a resiliently deformable housing including an interior passageway having wall portions adapted to receive and support the object, and wall portions which will be spaced from the object; which housing is deformed by the application of external compressive force at discrete locations causing the spaced wall portions to move toward the object, and resulting in the supporting wall portions moving away from the object, thereby affording the release of the object from the device.

8 Claims, 8 Drawing Figures

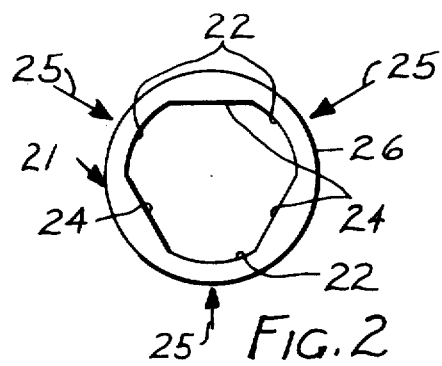
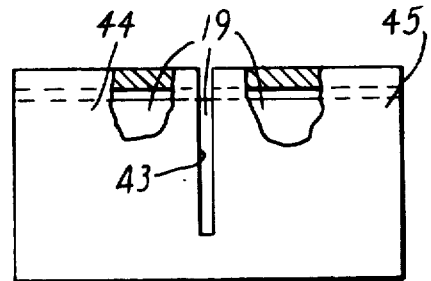
Fig. 2
Fig. 5
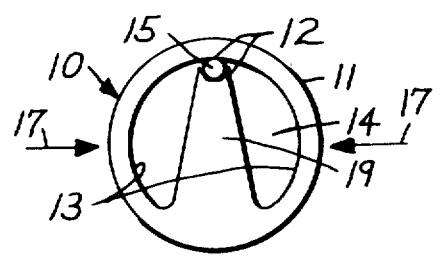
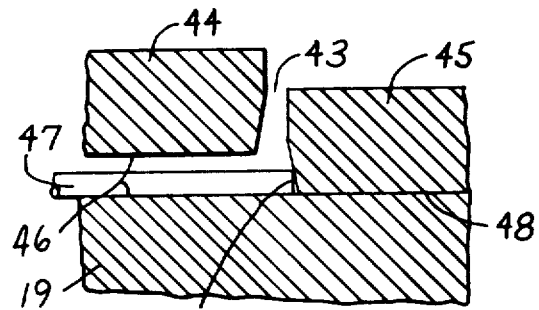
Fig. 1
Fig. 6A
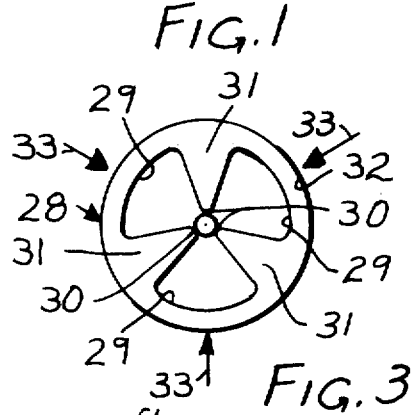
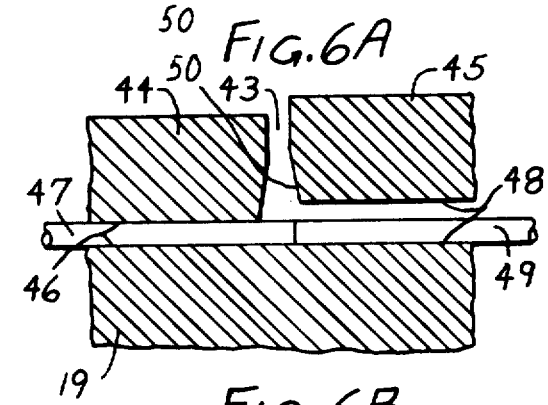
Fig. 3
Fig. 6B
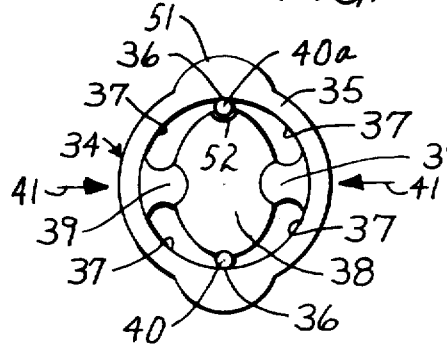
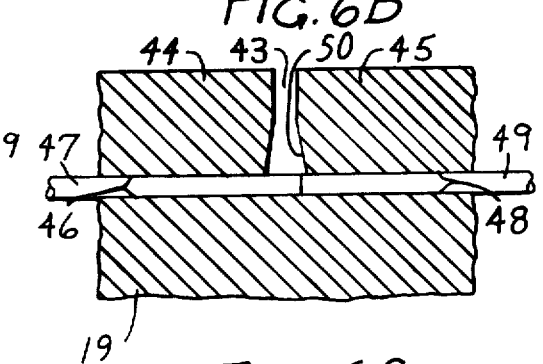
Fig. 4
Fig. 6C

DEVICE FOR RESTRAINING AN OBJECT OR OBJECTS THEREIN

BACKGROUND OF THE INVENTION

This invention relates to a device for restraining an object or objects therein, and in particular to a device for restraining an optical fiber or fibers therein.

Many devices are known which receive a portion of an object and which utilize complex internal structure that is biased into contact with the object to hold or restrain the object therein. Typically, this internal structure requires complex mechanical linkages to facilitate the release as well as the restraint of the object. Accordingly, the cost for the device, and the likelihood of its experiencing mechanical failure, are increased.

SUMMARY OF THE INVENTION

The present invention affords a simplified and low cost device for restraining an object or objects therein, including a deformable housing which, through its own resilience can restrain the object, but which will deform under the application of an external force, in a manner releasing the object from the housing or affording the insertion of the object within the housing. This device comprises a resiliently deformable housing including first and second interior wall portions defining an inner passageway therethrough. The first wall portions are adapted and disposed to receive and support the object. The second wall portions are, however, disposed to be spaced away from the object. Through the application of external force, the housing can be compressed at positions adjacent the second wall portions, forcing these second wall portions inward and resulting in the relative outward movement of the first wall portions in response thereto. This outward movement of the first wall portions releases the object from the device, or allows the object to be inserted within the device.

It must be noted that the device according to the present invention has particular utility in an optical fiber connector wherein one or more optical fibers are releasably supported by the first wall members. This is especially true in light of the need for a low cost optical fiber connector which is capable of accurately aligning the optical fibers therein.

DESCRIPTION OF THE DRAWING

The present invention will be further described hereinafter with reference to the accompanying drawing wherein FIGS. 1 through 4 are enlarged end views of various embodiments of a device according to the present invention;

FIG. 5 is an enlarged side view of a typical device according to the present invention with parts broken away and shown in section; and FIGS. 6a-6c are partial longitudinal sectional views of the device shown in FIG. 5.

DETAILED DESCRIPTION OF THE PREFERRED EMBODIMENT

One embodiment of a device 10 according to the present invention is illustrated in FIG. 1 wherein is shown a generally cylindrical housing 11. This housing 11 is preferably constructed from a polymeric material such as polycarbonate or polysulfone which has the property of being resiliently deformable. Materials which are also extrudable or moldable into the present configuration can further reduce the cost of the device, thereby adding to the advantages offered by the present invention. In general, materials offering similar resilient deformability to polysulfone or polycarbonate are however acceptable, e.g., various metals, ceramics, or glass. The housing 11 includes first and second interior wall portions (12 and 13 respectively) which define an inner passageway 14 therethrough, and which are alternately positioned around the passageway 14. The first wall portions 12 of the housing 11 are adapted and disposed to closely receive and thereby support an object 15 such as an optical fiber. The second wall portions 13 are disposed to be spaced from the object 15 when the object 15 is supported within the device 10. Through the application of a discrete compressive force in a direction and at the positions indicated by arrows 17 (e.g. with a pliers), the housing 11 can be deformed causing the inward movement of the second wall portions 13 toward the object 15. Since the housing 11 has a perimeter of a constant length, this inward movement of the second wall portions 13 forces the first wall portions 12 to move outward in response thereto. This outward movement of the first wall portions 12 releases the object 15 from the device 10.

The particular embodiment of the present invention shown in FIG. 1 has a housing 11 in which the second wall portions 13 define an essentially cylindrical perimeter (i.e. circular in cross-section) having, in its non-deformed state, a predetermined radius with respect to a longitudinal axis of the housing 11. The first wall portions 12 of this embodiment comprise at least one inward projection 19 from the housing 11 having a generally radial orientation with respect to the housing 11, and a distal end adapted to engage the object 15 (e.g. an optical fiber). FIG. 1 illustrates only a single projection 19 from the housing 11, and one resulting in an off-axis location for the object 15. In the case of an optical fiber, this off-axis orientation can be advantageous since the fiber, which typically still enters the connector at a central or on-axis location, must undergo a shallow "S" curve as it is directed off-axis from the entry point of the connector by the profile of the inward projection 19. This shallow "S" curve provides a small but important amount of slack within the fiber which can be used to compensate for any longitudinal motion or displacement of the fiber with respect to the connector 10.

A second embodiment 21 of the present invention is illustrated in FIG. 2. In this embodiment 21, the second wall portions 22 define an essentially cylindrical perimeter having a predetermined radius with respect to a longitudinal axis of the housing, and the first wall portions 24 are chord-like interruptions of the cylindrical perimeter which connect the adjacent second wall portions 22. The first wall portions 24 can either be straight (as shown) or arcuate without changing the operation of the device 21. This device 21 is distorted in a manner similar to that described above, i.e., by the application of an external compressive force in the directions and at the positions indicated by arrows 25. As can be seen, the first wall portions 24 interrupt the perimeter defined by the second wall portions 22 at a regular interval of 120 degrees. This introduces an additional location (i.e. three locations instead of two) where compressive force should be applied. The optimum operation of the device, therefore, requires a compression tool with a similarly configured (i.e. multipoint) jaw arrangement. Typically, the device 21 illustrated in FIG. 2 is for larger diameter objects such as bearings, optical lenses, or precision instrument parts which must be held in a collimated relationship. In these instances, the objects are probably larger and heavier, and therefore it is desirable and within the scope of this invention to machine (or in some cases extrude) the housings 26 from such materials as steel, various aluminum alloys, or other materials offering the required resilient deformation for the range of forces applied, and yet offering the required strength.

A third embodiment of the present invention is illustrated in FIG. 3. The device 28 shown has second wall portions 29 defining an essentially cylindrical perimeter, and first wall portions 30 which comprise three inward projections 31 from the housing 32. With this embodiment, the regular spacing of the inward projections 31 about the perimeter of the housing 32 is probably more apparent than in the embodiment illustrated in FIG. 1. Again, a compressive force exerted in the directions and at the locations indicated by arrows 33 will release or afford the entry of an object within the device 20.

A fourth embodiment is illustrated in FIG. 4. The device 34 shown has a resiliently deformable housing 35 including first and second interior wall portions (36 and 37 respectively) defining an inner passageway therethrough. This embodiment further includes an internal member 38 within the passageway, located proximate to the first wall portions 36. This internal member 38 can be attached to the second wall portions by elastomeric ties 39 that position the internal member 38 within the passageway, or it can be left unattached so as to float within the passageway. In this device 34 the first wall portions 36 are adapted to receive and support an object (or objects) 40, for example an optical fiber between the outer housing and the internal member 38. The housing 35 can be deformed by applying a compressive force in the direction and at the positions indicated by arrows 41. In this case, the second wall portions 37 will be forced inwardly toward the internal member 38. This results in the outward movement of the first wall portions 36 away from the internal member 38 in response thereto, thereby affording the release of the fiber 40 from the connector 34. The internal member 38 also allows the support of two parallel and spaced fibers 40 within the same device. In addition, the internal member 38 can be made hollow or "C-shaped" to afford the complete or partial encirclement of such items as other fibers, electrical circuits, structural supporting cables, etc., thereby allowing these items to be contained within the device 34. This figure also illustrates the incorporation of a lens element 51 into the housing at a location where the object 40 being supported terminates. This lens element 51 can be used to inspect the terminating end of the object 51 while it is within the device 34.

In addition to affording support for one or more objects, all of the embodiments of the present invention thus far described are capable of axially aligning or collimating two objects (as in a coupler). This is perhaps best illustrated in FIGS. 5 and 6. FIG. 5 shows an exterior side view for a typical housing 42 which can be utilized for any of the devices (e.g., the device illustrated in FIG. 1) thus far disclosed. Since the device is to be used as a coupler, the housing 42 typically is perforated around its circumference with one or more spaced slots 43. These slots 43 lie generally in a single plane which transversely intersects the housing 42. The slots 43 pass through the housing 42 to the internal passageway, effectively dividing the housing 42 into two or more connector clamping portions 44 and 45. The slots are typically located in the vicinity of the first wall portions (12, 24, or 36) so that each of the resulting clamping portions tends to become a discrete zone, for restraining any object within that zone that is contacted by the first wall portions of that zone. The connector portions 44 and 45 can either remain tied together by intact housing portion(s) between the slots 43, or the housing can be completely sectioned by the slots 43 with the connector portions held together by means such as a continuous internal member (e.g., internal member 38) which has end parts (not shown) extending radially beyond the outer diameter of the connector portions. In either case the connector portions are sufficiently restrained together to couple the objects or fibers supported therein.

The operation of the present invention as a coupler is apparent from the longitudinal sections of the housing 42 shown in FIGS. 6a, 6b, and 6c. In FIG. 6a a compressive force is shown applied to the housing only in the vicinity of connector portion 44. Hence only the first wall portion 46 which corresponds to the connector portion 44 will be forced outward. An optical fiber (object) 47 can therefore be inserted within this space. Since a compressive force has not yet been applied in the vicinity of the second connector portion 45, this second connector portion 45 remains undeformed. Hence the fiber 47 can be inserted within the connector until it contacts the wall portion 50 corresponding to the second connector portion 45. The compressive force applied adjacent the first connector portion 44 can then be released restoring the first connector portion 44 to its natural (undeformed) state, thereby supporting the fiber 47 therein. A compressive force can then be applied to the second connector portion 45 of the coupling. This compressive force will deform only the second connector portion 45 of the coupling, hence the corresponding wall portions 48 are moved outward, allowing a fiber 49 to be inserted within the resulting space. This fiber 49 can be inserted until it contacts the first fiber 47. The compressive force is then removed allowing the second connector portion 45 to return to its undeformed state. The fibers 47 and 49 are therefore supported (see FIG. 6c) within the coupling in a manner affording their axial and spatial alignment with each other. As is illustrated in FIG. 6, the connector wall portion 48 can be angled away from the fiber 47. This refinement of the connector 42 precludes the scuffing of the fiber end when the wall portion 48, first acting as a fiber stop, is moved radially outward in response to the deformation of the housing.

It can also be appreciated from the drawing that devices such as illustrated in FIGS. 2 or 3 will tend to axially align objects supported therein. This is true even if the objects are of slightly different diameters. Contrastingly, devices such as that illustrated in FIG. 1 will surface align the objects along the top surface of the continuous projection 19, which due to its larger mass deforms less readily. In this latter case, any slight diameter differences between the objects will be compensated for by a displacement in the outer walls of the housing 11 between the various connector portions.

As has already been alluded to, the various connector clamping portions tend to separate the connector into discrete zones of compressive force. Hence structures such as that illustrated in FIG. 4 can be utilized to independently support two or more optical fibers. To do this, the internal member 38 must be modified to include undercut portions 52 which will allow slippage for the fiber positioned with these undercut portions 52 between the internal member 38 and the housing 35. For example, if FIG. 4 illustrates one connector portion in the undeformed state, fiber 40 will be supported, while fiber 40a is free to move with respect to this section of the device 34 because of the undercut portion 52. The connector portion (not shown) adjacent to the one illustrated in FIG. 4 could contain an undercut internal member 38 in the vicinity of fiber 40 and a non-undercut internal member 38 in the vicinity of fiber 40a. Hence the housing 35 of the connector portion shown in FIG. 4 would be deformed to release or insert fiber 40, while the housing of the adjacent connector portion (not shown) would be deformed to release or insert fiber 40a. This structure could be used to independently support as many fibers as there were connector clamping portions with the device.

Having thus described a preferred embodiment of the present invention, it will be understood that changes may be made in the size, shape, or configurations of some of the parts described herein without departing from the present invention as recited in the appended claims.

What is claimed is:

1. A device for restraining an object or objects therein having a resiliently deformable housing including alternately positioned first and second interior wall portions defining an inner passageway therethrough, wherein said second wall portions define an essentially cylindrical perimeter having a predetermined radius with respect to a longitudinal axis of said housing and are disposed to be spaced from the object and wherein said first wall portions are chord-like interruptions of said cylindrical perimeter which connect adjacent second wall portions and are adapted and disposed to receive and support the object; said housing being deformable by the application of a compressive force at locations adjacent said second wall portions thereby forcing said second wall portions inwardly resulting in the outward movement of said first wall portions in response thereto, thus affording the release or entrance of the object from or within the device.

2. A device as claimed in claim 1 wherein said first wall portions interrupt said perimeter defined by said second wall portions at a regular interval of 120 degrees.

3. A device for restraining an object or objects therein having a resiliently deformable housing including alternately positioned first and second interior wall portions defining an inner passageway therethrough, wherein said second wall portions define an essentially cylindrical perimeter having a predetermined radius with respect to a longitudinal axis of the housing and are disposed to be spaced from the object, and wherein said first wall portions comprise at least one inward projection from said housing having a generally radial orientation with respect to the housing and a distal end adapted to engage the object; said housing being deformable by the application of a compressive force at locations adjacent said second wall portions thereby forcing said second wall portions inwardly resulting in the outward movement of said first wall portions in response thereto, thus affording the release or entrance of the object from or within the device.

4. A device as claimed in claim 3 wherein said projections are radially spaced around said cylindrical perimeter at a regular interval.

5. In an optical fiber connector, a device for restraining one or more optical fibers therein having a resiliently deformable housing including one or more first and second interior wall portions defining an inner passageway therethrough and an internal member within said passageway located proximate to said first wall portions and spaced from said second wall portions, wherein said second wall portions define an essentially cylindrical perimeter having a predetermined radius with respect to a longitudinal axis of the housing and are disposed to be spaced from the fiber, said first wall portions being adapted to support a fiber against said internal member, said housing being deformable as a result of applying a compressive force at locations adjacent said second wall portions thereby forcing said second wall portions inwardly toward said internal member, and resulting in the outward movement of said first wall portions away from said internal member in response thereto, thus affording the release or entrance of the fiber from or within the connector.

6. The optical fiber connector according to claim 5 wherein said first wall portions and said second wall portions are alternately positioned around said passageway.

7. The optical fiber connector according to claim 6 wherein said second wall portions define an essentially cylindrical perimeter having a predetermined radius with respect to a longitudinal axis of the housing, and wherein said first wall portions comprise at least one inward projection from said housing having a generally radial orientation with respect to the housing and a distal end adapted to engage the fiber.

8. The optical fiber connector according to claim 7 wherein said projections are spaced around said cylindrical perimeter at a regular interval.

* * * * *